June 8, 1965 L. E. BACCHUS ETAL 3,187,383
METHOD AND APPARATUS FOR SIZING EXTRUDED PLASTIC PIPE
Filed Aug. 2, 1962
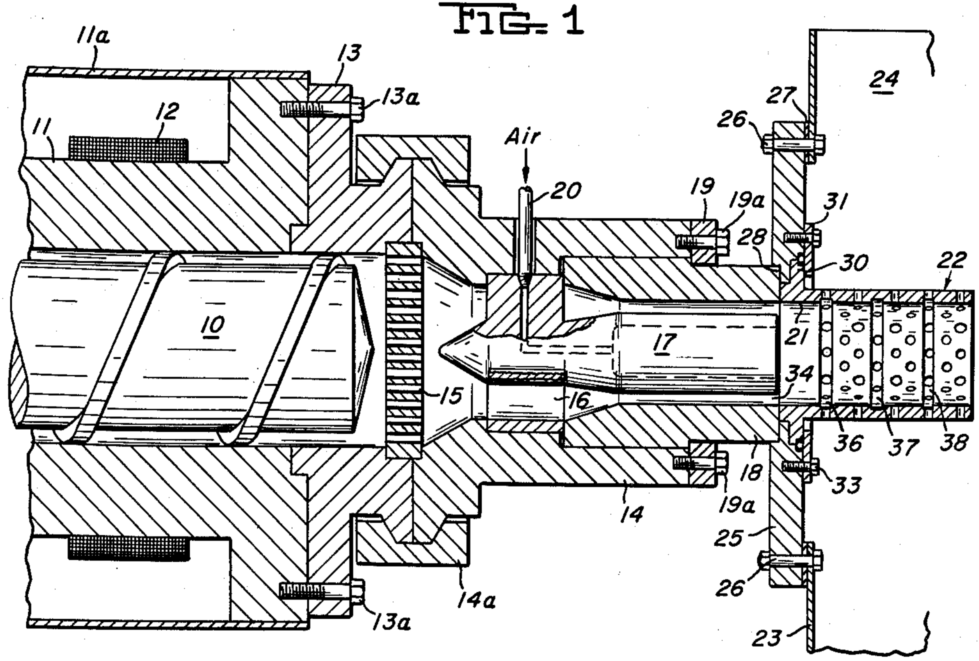
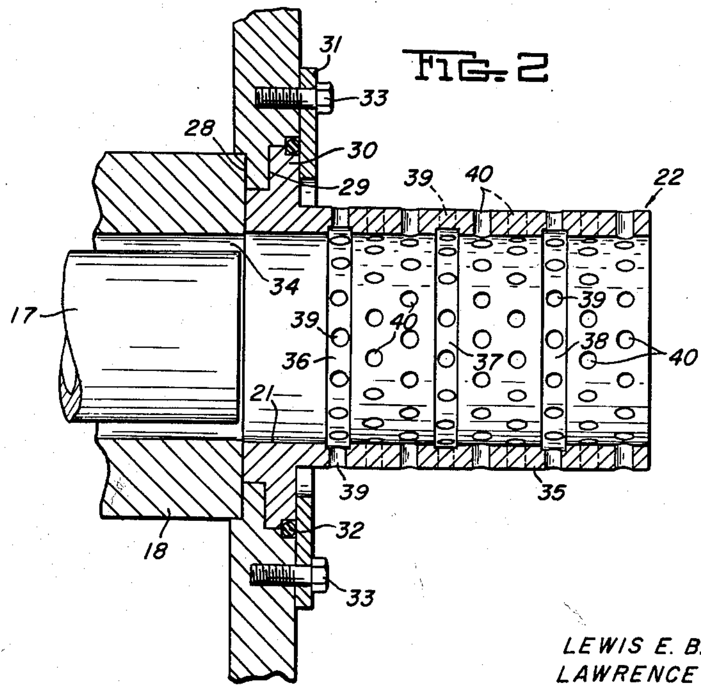
INVENTORS
LEWIS E. BACCHUS and
LAWRENCE A. LAVERY
By Donald G. Dalton
Attorney

United States Patent Office 3,187,383
Patented June 8, 1965

1

3,187,383
METHOD AND APPARATUS FOR SIZING EXTRUDED PLASTIC PIPE

Lewis E. Bacchus, Merrillville, and Lawrence A. Lavery, Gary, Ind., assignors to United States Steel Corporation, a corporation of New Jersey Filed Aug. 2, 1962, Ser. No. 214,418
6 Claims. (Cl. 18—14)

This invention relates to plastic-pipe extrusion and more particularly, to a method and apparatus for burnishing, sizing and cooling plastic pipe as it is being extruded.

Plastic pipe, particularly the various weights of polyethylene pipe in the commercial ½" to 1½" nominal size range, have been produced by extrusion from a conventional, single-screw-type extruder with a die and mandrel and then through an aluminum size ring or bushing that is indirectly water cooled and has a tapering bore about 1¼" long and an inlet diameter about .175" larger than the inside diameter of the extruder die. The sizing ring may be bolted to the inside of a reciprocable, open-top, water container and also may be bolted to or simply have a close fit with the outlet of the extruder. The pipe is further cooled by immersion under 4" to 6" of water in its passage on rollers through one or more water containers. A capstan or pinch rolls in one of the containers aids the extruder in moving the pipe to a pipe-coil reel. While the sizing to nominal pipe size is effected by low-pressure air on the inside and by the sizing ring and water-cooling shrinkage, the grip of the capstan may also reduce the outside diameter of the pipe by about .005".

The pipe produced by this method has a very dull outside finish and contains surface inclusions caused by the normal imperfections in the bore of the sizing ring which also pick up particles from the still plastic pipe. These particles harden by contact with the immersed, water-cooled bore of the ring and abrade the pipe.

It is therefore an object of our invention to provide an improved sizing ring that burnishes the pipe to a gloss, reduces surface imperfections and increases production.

A more specific object is to provide an apparatus whereby burnishing, sizing and cooling is effected by passing extruded pipe through a water-cooled bushing having a decreasing-taper bore wherein a plurality of spaced-width, circumferential water grooves on the interior of the bore which serve to burnish and size the pipe.

In accomplishing these and other objects of the invention, we have provided method and apparatus, a preferred form of apparatus being shown in the accompanying drawings. In the drawings:

FIGURE 1 is a cross-sectional view of a portion of a plastic-pipe extruder and a bushing or ring of invention; and FIGURE 2 is an enlarged portion of FIGURE 1.

As shown in FIGURES 1 and 2, a plastic-pipe extruder includes a hopper (not shown) feeding plastic granules to a rotatable screw 10 enclosed in a barrel 11 which is in turn enclosed by a guard **11*a* and heated by an induction coil 12. An adaptor 13 bolted by bolts 13*a* to the outlet end of barrel 11, has a die body 14 clamped flush thereto by a clamping ring 14*a*. Supported between adaptor and die body are a perforated breaker plate 15, to homogenize the hot plastic and, a spider plug 16 with attached hollow mandrel 17 spaced from die body 18 to define the wall of an extruded pipe. The described parts are held in place by an end ring 19 and bolts 19*a*. A pipe 20 supplies compressed air to the inside of mandrel 17 and thus to the extruded pipe to expand it against a decreasing taper bore 21 of a bushing 22**.

The bushing 22 extends through an opening in a side plate 23 of an open-top water tank 24 reciprocable longitudinally on wheels (not shown). An end plate 25 is

2 bolted by bolts 26 to the outside of plate 23 and sealed against water leakage by a gasket 27. Plate 25, at its inner end, has an annular recess 28 machined therein to receive the outlet end of die body 18 in a snug fit when tank 24 is moved into place. At its outer end, plate 25 has a stepped, annular recess 29 machined therein to meet recess 28 and to receive a flange 30 of ring 22. An annular plate 31 holds flange 30 and sealing ring 32 in place against plate 25 by means of bolts 33.

The burnishing, siding and cooling bushing 22 shown pressed or abutted flush against the outlet end of die body 18 by reciprocable water tank 24 and communicating with the annular outlet 34 of the extruder, comprises a flange 30 integral with a cylindrical portion 35 having a common bore 21, decreasing in diameter from the inlet to the outlet thereof. The inlet diameter of the bore is usually between about .050" and .060" larger than the inside diameter of die body 18, to permit relief of the relatively high pressure under which the hot, plastic pipe is extruded. Following this pressure relief, the pipe is prevented from collapsing and is expanded into contact with the bore by air from pipe 20, under a controlled pressure between about .5 p.s.i. and 3.0 p.s.i., respectviely, when extruding polyethylene plastic pipe in a size range from ½" to 1½". The aluminum bushing or ring, which may be fabricated of other heat-conductive metal, has an inlet bore diameter which is about .050" larger, an outlet bore diameter which is about .030" larger and a length between about 2 and 2.5 times the nominal diameter of pipe in the ½" to 1½" range. The taper angle will vary inversely with the pipe size, being about 0° 22' for ½" pipe and about 0° 8' for 1½" pipe. The bore is preferably divided into substantially equal portions by three circumferential grooves 36, 37, 38, supplied with water or other liquid by spaced, circumferential perforations 39. Preferably, perforations 40, similar to perforations 39, are circumferentially spaced and staggered in the bore between the innermost groove 36 and the outlet of the bore. The perforations are shown as round holes, for ease of fabrication, although the perforations may be staggered slots or of other configurations.

In operation of the apparatus shown in FIGURES 1 and 2 and more particularly of ring 22, polyethylene granules are fed from the hopper (not shown) to the rotating screw 10 and softened to the proper temperature by induction coil 12 surrounding barrel 11. The screw forces the hot plastic through breaker plate 15, spider plug 16 and into annular opening 34, between mandrel 17 and die body 18, which determines the outside diameter of the pipe and the wall thickness thereof. An operator collapses and cools the extruding plastic mass and threads it through ring 22. Once this is accomplished, tank 24 is rolled to abut ring 22 against die body 18, as shown in the drawings, the required air pressure is applied through pipe 20 and the water level in tank 24 is quickly raised between about 6" and 8" above the center line of ring 22.

As plastic pipe issues from the end of the extruder through annular opening 34 its extrusion pressure of between about 5000 and 6000 p.s.i. is relieved by expansion into the larger bore of ring 22 and expanded into contact therewith by the internal air pressure from pipe 20. Ring 22, immersed in water, is sufficiently cool to permit a thin skin of cooler, harder plastic to form on the outside of the pipe in the first portion of the bore between the inlet and groove 36. When the pipe reaches the first of the grooves, which are preferably cut about ⅛" wide and 1/32" deep and are supplied with water through 3/32" perforations on ⅛" centers, circumferentially, the pipe carries or sucks along a circumferential film or ring of water and is burnished and sized against the outer edge of the groove and therebeyond. Movement of the pipe past the three grooves imparts a desirable, glossy finish to the pipe.

It is believed that the pliable, expanded pipe may extrude slightly into the grooves with resultant wiping against the outer edge of a groove as it is again straightened. The internal, expanding pressure must be carefully controlled, since too great a pressure may reduce or perhaps even eliminate or interrupt in spaced areas the formation of a complete water ring or film. Instead of the desired burnishing, this will result in the previously experienced friction or drag on the pipe, with resultant surface inclusions. Too low an internal pressure will result in too thick a ring or film and insufficient burnishing. Then too, since the temperature of the plastic pipe is greater than the boiling point of water, there may be undesirable bubbles formed by the generated steam. For ½" polyethylene pipe, the critical internal air pressure is usually between about .5 and .75 p.s.i. At the other end of the size range, for 1½" polyethylene pipe, the critical air pressure is usually between about 1 and 3 p.s.i. This critical range is not absolute for a given pipe size, pipe weight or plastic material, but must be determined by observation at all times, due to the variation in such factors as shrinkage and melt index, which can vary appreciably from batch to batch of the same class of plastic material.

It is possible to burnish, size and cool plastic pipe utilizing the ring described hereinabove having a decreasing-taper bore and a plurality of circumferential, liquid-supplied grooves that burnish the pipe and smooth out pick-up and surface inclusions from the bore portions between the rings. It has been found, however, that when these bore portions are perforated with circumferential, staggered perforations similar to those supplying liquid to the circumferential grooves, the resulting circumferential liquid droplets carried by the moving pipe result in a more completely cooled pipe having a better surface finish. Reduction in the total metal surface area reduces the chances for pick-up and surface inclusions, whereas the droplet film reduces the adverse effect of any irregularities present in the bore surface. After a pipe is burnished, sized and cooled in the ring of our invention, it is handled in a well-known manner over rollers and through the cooling liquid in one or more open-top tanks to complete the shrinkage to size. A capstan pulls the pipe through the tanks, reducing its diameter slightly, then moves it to a pipe-cooling reel. The pipe speed is inverse to pipe size and varies between about 65 f.p.m. for ½" pipe and 19 f.p.m. for 1½" pipe.

While the several figures of the drawing and the above explanation illustrate a preferred method and apparatus for practicing our invention, other conditions of operation and ring structure may be used without departing from the spirit of the invention. A preferred decreasing-bore diameter that is .05" larger at the inlet and .03" larger at the outlet than a nominal pipe size has been found effective for handling a size range of pipe from ½" to 1½" pipe, in wall thicknesses that meet standard specifications for pipe to withstand commercial operating pressures between about 65 and 100 p.s.i. Changes in a decreasing-bore dimension will be dependent on physical characteristics such as shrinkage and melt index of the plastic mass for larger pipe and for plastics other than polyethylene. These preferred inlet and outlet bore diameters may be varied by ±.01". With diameter increase, a lesser intrnal air pressure would be used to avoid over-sized pipe. The operator must then be alert to avoid water rings or film that are too thick and do not burnish properly. With diameter decrease, a greater internal air pressure would be used to avoid under-sized pipe. The operator must then be alert to avoid water rings or film that are too thin or that are interrupted at spaced areas resulting in pipe drag, poor surface finish or increased inclusions.

The preferred length of the bushing or ring is between about 2 and 2.5 times the nominal pipe diameter. For any given pipe size, wall thickness or plastic material, a minimum length is more critical than a maximum length greater than about 2.5 times the nominal pipe size. The length should be sufficient to properly burnish, size and cool the pipe. A greater length should make it simpler to achieve preferred results. The length is preferably made up of substantially equal-width bore portions. Thus for 1", 100 p.s.i. standard specification pipe, the width of each of the preferred four bore portions is about ⅞". For every ¼" change in pipe size therefrom this width may be changed by ⅛". Whereas a ring length greater than 2½ times nominal pipe size may be used, it should be pointed out that threading a plastic mass through a relatively long, small-diameter ring can be a tedious operation, especially with frequent changes for size or plastic. It has been found for ½" and ¾" pipe, the bore portion width may be about ⅜" and ⅝" respectively rather than ⅝" and ¾" respectively according to the above formula, with a ring length of about 1¾" and 2½" respectively, which approaches the preferred minimum ring length.

It is preferred to use three grooves equally spaced from the outlet end of the ring, the grooves being about ⅛" wide and about $\frac{1}{32}$" deep. Even one groove would produce a better finish than a prior-art ring. A minimum of two grooves is required for proper suspension of the moving pipe in the bore, a 3-point suspension afforded by three grooves being preferred. More than three grooves may be used. A further increase in the number of grooves and the corresponding increase in the water rings, or film, would result in cooling and hardening the surface too quickly and reduce the gloss finish. It is believed the pipe upsets into the grooves since with increase in width from ⅛" to $\frac{3}{16}$" increased drag is noted, which would be detrimental were the width and depth increased further. Decreasing the width beyond $\frac{3}{32}$" would appear to impinge upon and restrict a proper flow of water for burnishing. The surface tension of the water would have the same restrictive effect on water flow should the perforations to the grooves or therebetween be decreased below the preferred $\frac{3}{32}$" diameter.

The bore portion between the inlet and first groove produces a thin skin of cooler, harder plastic. While its width may be somewhat greater than the above-formulated distance between the three grooves, it should not be decreased too greatly, since this skin must be present for good burnishing. However, it should not be cooled too excessively. Hence, there should be no perforations between the bore inlet and the first groove.

Water is preferred as an economical coolant and burnishing medium. However, other liquids may be employed or a wetting agent may be added to the water to properly "wet" a plastic and to permit formation of the required, continuous circumferential water rings or films. A pressure or a head between about 6" and 8" water above the center line of a ring has been found sufficient to supply water to the bore through the grooves and perforations. A greater pressure may be used, should the preferred groove dimensions and perforations be decreased.

The invention is characterized by several distinct advantages. In the first place, the burnishing and improved sizing and cooling has resulted in an improved, glossy finish and an appreciable reduction in surface imperfections. Secondly, the reduction in drag or frictional disturbances has improved the rate of production, despite the fact that our bushing has a longer bore for the pipe to traverse than prior-art bushings.

Although we have disclosed herein the preferred practice and apparatus of invention, we intend to cover as well any change or modification therein which may be made without departing from the spirit and scope of the invention.

We claim:

1. Apparatus for sizing extruded plastic pipe comprising a die through which said pipe is extruded, a bushing including a flange abutting the end of said die, said bushing having an axial bore of decreasing diameter from inlet to outlet, said bore at its inlet end communicating with said extruder die and having a diameter sufficiently larger than that of said die to permit expansion of the extruded pipe against the bore and to relieve the pressure in said extruder die, said bore having at least two circumferential grooves therein spaced along the axis thereof, said bushing having spaced, radial perforations therethrough and extending outwardly from each of said grooves.

2. Apparatus as defined in claim 1 characterized by said bushing having spaced, radial perforations therethrough between said innermost groove and said outlet.

3. Apparatus as defined in claim 1 characterized by said bushing having a length at least about two times the average diameter of said bore.

4. Apparatus as defined in claim 1 characterized by said bore having an outlet diameter between about .02" and .04" smaller than said inlet diameter.

5. Apparatus as defined in claim 4 having a bore that tapers between about 0°8' and 0°22'.

6. Apparatus for burnishing, sizing and cooling extruded plastic pipe comprising a container for cooling liquid, a die through which pipe is extruded into said liquid, a bushing immersed in said liquid including a flange abutting said die, said bushing having an axial bore decreasing in diameter from inlet to outlet, said bore at its inlet end communicating with said die and having a diameter about .05" larger than the diameter of said die, pressure means in said extruder adapted to expand said pipe against said bore, said bore having at least two circumferential grooves therein uniformly spaced along the axis thereof, said bushing having spaced, radial perforations therethrough and extending outwardly from each of said grooves.

References Cited by the Examiner

UNITED STATES PATENTS

| | | | |
|---|---|---|---|
| 2,616,128 | 11/52 | Barry et al. | 18—55 |
| 2,736,064 | 2/56 | Rubin | 18—12 |
| 2,902,716 | 9/59 | Colombo | 18—14 |
| 2,947,032 | 8/60 | Taylor | 18—14 |
| 2,987,776 | 6/61 | Miller et al. | 18—57 |
| 3,054,142 | 9/62 | Hinderer et al. | 18—55 |
| 3,090,991 | 5/63 | Hathaway | 18—14 |
| 3,095,608 | 7/63 | Munsell | 18—55 |

FOREIGN PATENTS

| | | |
|---|---|---|
| 563,423 | 5/57 | Italy. |

MICHAEL V. BRINDISI, *Primary Examiner.*

MORRIS LIEBMAN, *Examiner.*